(12) United States Patent
Kuhn et al.

(10) Patent No.: US 11,479,959 B2
(45) Date of Patent: Oct. 25, 2022

(54) SEPARATION DEVICE FOR REMOVING OBJECTS FROM A WATER STREAM AND METHOD FOR OPERATING SUCH A SEPARATION DEVICE

(71) Applicant: JUERGEN KUHN UND MICHAEL KUHN GRUNDSTUECKSVERWALTUNGS—UND VERPACHTUNGS GBR, Hoepfingen (DE)

(72) Inventors: Michael Kuhn, Hoepfingen (DE); Stefan Blaha, Adelsheim (DE)

(73) Assignee: JUERGEN KUHN UND MICHAEL KUHN GRUNDSTUECKSVERWALTUNGS—UND VERPACHTUNGS GBR, Hoepfingen (DE)

( * ) Notice: Subject to any disclaimer, the term of this patent is extended or adjusted under 35 U.S.C. 154(b) by 335 days.

(21) Appl. No.: 16/402,459

(22) Filed: May 3, 2019

(65) Prior Publication Data
US 2019/0338505 A1    Nov. 7, 2019

(30) Foreign Application Priority Data

May 3, 2018    (DE) .......................... 102018110633.5

(51) Int. Cl.
*E03F 5/14*    (2006.01)
*B01D 33/00*    (2006.01)
(Continued)

(52) U.S. Cl.
CPC .............. *E03F 5/14* (2013.01); *B01D 33/333* (2013.01); *C02F 1/004* (2013.01); *C02F 1/008* (2013.01);
(Continued)

(58) Field of Classification Search
CPC .... E03F 5/14; E02B 7/205; E02B 7/20; E02B 7/00; B01D 33/0058; B01D 33/00;
(Continued)

(56) References Cited

U.S. PATENT DOCUMENTS

2015/0268671 A1    9/2015    Bischof

FOREIGN PATENT DOCUMENTS

DE    3329214    2/1985
DE    3329215    2/1985
(Continued)

OTHER PUBLICATIONS

DE 102016110760 A1 English description, Nov. 2017, Bischof Rudolph et al.*
(Continued)

*Primary Examiner* — Akash K Varma
(74) *Attorney, Agent, or Firm* — Sheridan Ross P.C.

(57) ABSTRACT

The invention relates to a separation device for removing objects from a water flow, comprising a separation screen and a channel which forms an inlet and an outlet for the separation screen, wherein, during operation, a head water having a head water level can be provided in the inlet upstream of the separation screen and a tail water having a tail water level can be provided in the outlet downstream of the separation screen, wherein the outlet comprises an outlet cross-section for the water flow. The separation device is characterised by a damming body, which can be adjusted via an actuator, for immersion into the outlet, said damming body being able to be adjusted at least between a first position and a second position, wherein the outlet cross-section is smaller in the first position and the outlet cross-section is larger in the second position, and comprising a control device, wherein the control device includes a first operating mode, in which the flow rate in the area of the
(Continued)

separation screen is increased by bringing the damming body from the first position to the second position, wherein the control device includes a second operating mode, in which the flow rate in the area of the separation screen is changed by bringing the damming body from the second position to a third position, wherein the outlet cross-section in the third position is smaller or larger than in the second position, and wherein the control device is configured to automatically activate the first and/or the second operating mode. The invention also relates to a method for operating such a separation device.

17 Claims, 3 Drawing Sheets

(51) Int. Cl.
  *E02B 7/20*     (2006.01)
  *C02F 1/00*     (2006.01)
  *B01D 33/333*   (2006.01)
  *C02F 103/00*   (2006.01)

(52) U.S. Cl.
  CPC ........ *E02B 7/205* (2013.01); *C02F 2103/001* (2013.01)

(58) Field of Classification Search
  CPC ........ B01D 33/333; C02F 1/004; C02F 1/008; C02F 1/00; C02F 2103/001
  USPC .......................................................... 210/744
  See application file for complete search history.

(56) References Cited

FOREIGN PATENT DOCUMENTS

| | | | |
|---|---|---|---|
| DE | 3823614 | 1/1990 | |
| DE | 3823614 A1 * | 1/1990 | ............. G01F 15/00 |
| DE | 102016109836 | 11/2017 | |
| DE | 102016110760 | 11/2017 | |
| DE | 102016110760 A1 * | 11/2017 | ............... E02B 7/40 |
| EP | 2933391 | 10/2015 | |

OTHER PUBLICATIONS

DE 3823614 A1 English descriptioin, Jan. 1990, Fahrner Heinz ING Grad.*

Search Report for German Patent Application No. 102018110633.5, dated Feb. 7, 2019, 10 pages.

* cited by examiner

SEPARATION DEVICE FOR REMOVING OBJECTS FROM A WATER STREAM AND METHOD FOR OPERATING SUCH A SEPARATION DEVICE

CROSS-REFERENCE TO RELATED APPLICATION

This application claims the benefit of German Patent Application No. DE 10 2018 110 633.5 filed May 3, 2018, the entire contents of which are incorporated herein by reference.

FIELD

The invention relates to a separation device for removing objects from a water flow, comprising a separation screen and a channel which forms an inlet and an outlet for the separation screen, wherein, during operation, a head water having a head water level can be provided in the inlet upstream of the separation screen and a tail water having a tail water level can be provided in the outlet downstream of the separation screen, wherein the outlet comprises an outlet cross-section for the water flow, comprising a damming body, which can be displaced via an actuator, for immersion into the outlet, wherein the damming body can be displaced at least between a first position and a second position, wherein the outlet cross-section is smaller in the first position and the outlet cross-section is larger in the second position. In particular, the separation device can be designed as a screening device, wherein the separation screen is designed as a bar screen. Furthermore, the separation device can be designed as a screening device, wherein the separation screen is designed as a sieve screen. The invention also relates to a method for operating a separation device for removing objects from a water flow, wherein the separation device comprises a separation screen and a channel which forms an inlet and an outlet for the separation screen, wherein a head water having a head water level is provided in the inlet upstream of the separation screen and a tail water having a tail water level is provided in the outlet downstream of the separation screen, wherein the outlet comprises an outlet cross-section for the water flow, wherein the separation device comprises a damming body, which can be displaced via an actuator, for immersion into the outlet, said damming body being able to be displaced at least between a first position and a second position, wherein the outlet cross-section is smaller in the first position and the outlet cross-section is larger in the second position.

BACKGROUND

Separation devices per se are known and are regularly used in order to remove objects from a water flow. In particular, mechanical pre-cleaning of a water flow can be performed in this manner. Typical fields of application of such separation devices are wastewater treatment plants and sewage treatment plants, which can include corresponding separation devices.

EP 2 933 391 A1 describes a separation device which is designed as a sieve or rake device. The previously known separation device comprises a damming body which is arranged downstream of the separation screen in the flow direction. The damming body can be used to influence the water level of the tail water.

SUMMARY

In contrast thereto, the object of the invention is to provide a separation device and a method for operating a separation device, which permit improved separation of objects from the water flow.

The object is achieved in a separation device having the features of claim 1. Accordingly, a separation device stated in the introduction is characterised by a control device, wherein the control device includes a first operating mode, in which the flow rate in the area of the separation screen is increased by bringing the damming body from the first position to the second position, and wherein the control device includes a second operating mode, in which the flow rate in the area of the separation screen is changed by bringing the damming body from the second position to a third position, wherein the outlet cross-section in the third position is smaller or larger than in the second position, and wherein the control device is configured to automatically activate the first and/or the second operating mode.

In the case of a method for operating a separation device, the object is achieved by the features of claim 14. Accordingly, in the case of the method stated in the introduction, it is provided that the separation device comprises a control device, wherein the control device includes a first operating mode, in which the flow rate in the area of the separation screen is increased by bringing the damming body from the first position to the second position, and wherein the control device includes a second operating mode, in which the flow rate in the area of the separation screen is changed by bringing the damming body from the second position to a third position, wherein the outlet cross-section in the third position is smaller or larger than in the second position, and wherein the control device automatically activates the first and/or the second operating mode.

Particularly effective cleaning of the water flow can be achieved by the claimed separation device and the claimed method. In particular, it is possible to achieve a good separation rate even under different conditions. Effective cleaning of the water flow can be achieved in this manner, on the one hand in the case of smaller water quantities, as occur in sewage treatment plants e.g. at times of the day when the inflow is low. A good cleaning result can be achieved even in the case of larger quantities of the material to be separated, which can occur in particular at times of the day when the inflow is higher. Furthermore, effective separation can also be achieved in the event of precipitation, such as e.g. thundershowers, and correspondingly large water quantities. In this respect, it is necessary to take into consideration that a separation device is designed basically for a maximum water flow. In a sewage treatment plant, this can be e.g. the water flow, which occurs during heavy rain. However, the situation of maximum water flow is generally reached only on a few days in the year. Therefore, the separation device is used most of the time with a water flow, which is considerably less than the maximum water flow for which the separation device is designed. Nevertheless, optimised separation can be achieved by reason of the control device even in the case of a water flow, which is considerably less than the maximum water flow. A further advantage is that the control device can also prevent the undesired deposition of sand (and similar material heavier than water) on the bottom upstream of the separation screen. The flow rate in the inlet and the outlet can be influenced by the separation device with the control device in such a manner that, on the one hand, the retention of the separation device is improved. This is assisted in particular by the setting of a reduced flow rate of the water flow in the area of the separation screen by raising the tail water level with the damming body. As a result, water flows through the passages in the separation screen more uniformly and with reduced turbulence. Moreover, the screenings are urged less forcefully into or through the passages. In this manner, the separation performance can be improved considerably. Furthermore, it is advantageous if the flow rate is not too low because otherwise, this can lead to the deposition of sand and other material upstream of the separation screen. The damming body can be used to reduce the flow rate of the water flow through the separation screen which can include e.g. screen bars, e.g. in that the damming body (or a portion thereof) is moved downwards so that the outlet cross-section is reduced. Conversely, when the damming body is immersed into the tail water, the flow rate of the water flow in the separation screen is increased, e.g. in that the damming body (or a portion thereof) is moved upwards so that the outlet cross-section is increased. The described separation device comprising the damming body and the control device, which includes the first and the second operating mode, enables the setting of the flow rate in a favourable range so that the described disadvantageous effects are reduced. Therefore, the invention also contributes to improved reliability of the separation device. Moreover, the operating costs can be lowered. In addition, the separation device can also be used for reacting to the so-called flushing surge. In a phase with low water flow, objects can initially remain in the sewage pipes upstream of the inlet. Then, if there is an increase in the water flow, these objects are entrained by the water flow. Thus, as the water flow increases, a considerably larger quantity of objects initially arrives in this manner at the separation device. If the water flow continues, the quantity of objects decreases because the objects, which had remained have been flushed out at the beginning of the increase in water. This effect occurs e.g. during mornings if, after a night with a reduced water occurrence, a large number of people get up and increase the consumption of water. Therefore, after the night, there is regularly an increased accumulation of objects, which are to be removed from the water flow by the separation device. The effect of the flushing surge also occurs when it rains more heavily for the first time after a dry phase. The third position of the damming body can correspond to the first position. However, it is also possible that the outlet cross-section in the third position is larger or smaller than the outlet cross-section in the first position. Furthermore, it can be provided that the control device comprises one or a plurality of further operating modes in addition to the first and the second mode. In particular, it can be provided that the damming body can be moved to a multiplicity of (further) positions each having a different outlet cross-section. In this manner, the separation device can be even more effectively controlled and adapted to the respective situation. The adjustable immersion body can be immersed into the outlet in different ways. For example, the immersion body can be moved from above or from a side wall of the channel into the outlet in order to change the outlet cross-section. Furthermore, the immersion body can have a variable shape and/or size in order to change the outlet cross-section when being immersed into the outlet.

In accordance with the invention, it is preferred that the control device in the second operating mode reduces the flow rate in the area of the separation screen by bringing the damming body from the second position to the third position, wherein the outlet cross-section is smaller in the third position than in the second position.

Furthermore, the invention provides that the control device is configured to automatically activate the first and/or the second operating mode. If the first and the second operating mode are activated, this is performed consecutively. In this manner, the control device can implement automatically an adaptation to the respective operating situation. In so doing, it is possible that the control device implements a change from the first to the second operating mode as well as a change from the second to the first operating mode. Moreover, the control device can be configured to automatically activate at least one further operating mode.

A reduced outlet cross-section can be advantageously achieved by bringing the damming body (or a portion thereof) by the actuator from a higher position downwards to a deeper position and is thereby immersed to a greater extent into the tail water. An increased outlet cross-section can be achieved in particular by bringing the damming body (or a portion thereof) upwards by the actuator from a deeper position to a higher position so that the damming body is immersed to a lesser extent into the tail water or is moved out of the tail water. In this manner, the outlet cross-section can be effective and reliably set, wherein the plant costs can be kept low. However, the damming body can also influence the outlet cross-section in another way. For example, the outlet cross-section can be reduced or increased by changing the volume and/or the position of the damming body.

An advantageous embodiment of the invention provides that the separation screen is a bar screen. The bar screen can have in particular a plurality of screen bars, between which passages for the water flow are formed. Preferably, a multiplicity of screen bars arranged in parallel are provided. The damming body can be used to reduce the flow rate of the water flow between the screen bars, in that e.g. the damming body (or a portion thereof) is moved downwards so that the outlet cross-section is reduced. Conversely, when the damming body is immersed into the tail water, the flow rate of the water flow between the screen bars can be increased, in that e.g. the damming body (or a portion thereof) is moved upwards so that the outlet cross-section is increased.

According to an advantageous embodiment, it is provided that the separation screen is designed as a sieve screen. The sieve screen comprises sieve openings. In comparison with a bar screen, improved retention can be achieved with a sieve screen, wherein, however, the flow resistance is higher.

In an advantageous manner, it is provided that the control device includes a time program which triggers the activation of the first and/or the second operating mode. In this manner, the separation device can be adapted e.g. to regularly occurring effects, such as a morning flushing surge, in that the second operating mode is activated at the respective time. Then, after a time period has elapsed, the first operating mode can again be activated.

In a particularly preferred embodiment of the invention, it is provided that the control device comprises a first sensor, by means of which a first sensor signal is generated, and that the control device triggers an activation of the first and/or the second operating mode in dependence upon the first sensor signal. The activation can be performed e.g. as a change from the first to the second operating mode and/or from the second to the first operating mode. In this manner, the separation device can be automatically adapted to the respective operating state.

In an advantageous development of this concept of the invention, it is provided that the first sensor generates a first sensor signal, which is dependent upon the size of the water flow. In this way, the separation device can be controlled or regulated on the basis of the respective water flow volume. In particular, the height of the head water level and/or a measurement value associated with the water flow volume, such as e.g. the flow rate, can be ascertained by the first sensor.

Furthermore, it is advantageous if the control device comprises a second sensor, by means of which a second sensor signal is generated, wherein the control device triggers an activation of the first and/or the second operating mode in dependence upon the second sensor signal. This allows even better control of the separation device. In particular, a tail water level or a measurement value associated therewith can be ascertained by the second sensor.

Moreover, it can be provided that the control device comprises at least one further sensor, which generates at least one further sensor signal. This allows even better control of the separation device.

In a preferred embodiment of the invention, it is provided that a first trigger value for the first sensor signal and/or the second sensor signal is stored in the control device and that the control device activates the first operating mode when the first trigger value is reached or exceeded. In this way, the outlet cross-section can be increased e.g. if the water flow becomes large.

Furthermore, it is preferred that a second trigger value for the first sensor signal and/or the second sensor signal is stored in the control device and that the control device activates the second operating mode when the second trigger value is reached or when the value reached falls below the second trigger value. In this way, the outlet cross-section can be reduced e.g. if the water flow becomes smaller.

Furthermore, in an advantageous manner provision, it can be provided that a third trigger value for the first sensor signal and/or the second sensor signal is stored in the control device and that the control device activates the first operating mode when the third trigger value is reached or when the value falls below the third trigger value. In this way, it is possible to react in particular to a very low water flow, in which a reduction in the flow rate would result in undesired depositions upstream of the separation screen.

In a further preferred embodiment of the invention, it is provided that the first sensor detects the head water level and the second sensor detects the tail water level, that a fourth trigger value is stored in the control device, and that the control device triggers cleaning of the separation screen with a cleaning device if a difference between the first sensor signal and the second sensor signal reaches or exceeds the fourth trigger value. In this way, a clogged or blocked separation screen can be automatically ascertained and the cleaning can be activated.

The cleaning device can have e.g. circulating rakes which are moved along the bars of the bar screen. According to a further preferred embodiment, the separation device comprises a bar screen designed as stepped screen and which can be cleaned by reason of movable fins of the bar screen which are provided with a drive. Furthermore, the cleaning device can have a spiral conveyor upstream of the separation screen. Furthermore, it can be provided that the separation screen which can be designed e.g. as a perforated plate, rotation rake or rotation sieve can be moved upwards and/or rotated by the cleaning device in order to remove impurities. Moreover, brushes and/or spray nozzles can be provided which are suitable in particular also for cleaning sieve screens.

Furthermore, in a particularly preferred manner, it can be provided that the control device forms a control loop having a controller, which generates a control signal for the actuator of the cleaning device, and that the first sensor signal and/or the second sensor signal is used as a control variable of the control loop. In this way, it is possible to perform regulated operation of the cleaning device so that even under changing operating states, effective retention of the separation device is achieved, wherein at the same time the undesired deposition of sand (or other objects heavier than water) upstream of the separation screen is reduced. For example, the cleaning device can be put into operation by the control device until the height difference between the head water and the tail water, as ascertained by the first and second sensor signal, is in a specified range.

In accordance with the invention, in an advantageous manner, it can be provided that the first, the second, the third and/or the fourth trigger value are variable. In this manner, the control can be further improved. Depending upon the operating situation, e.g. in dependence upon at least one measurement value, the respective trigger value (or respective trigger values) is then adapted by the control.

In accordance with the invention, it is also particularly preferred if the control device comprises a flushing surge detection which detects an increase in the water flow with the aid of at least one of the first and the second sensor signal, wherein a flushing surge trigger value is stored in the control device and wherein, if the at least one of the first and the second sensor signal or an increase in the at least one of the first and second sensor signal reaches or exceeds the flushing surge trigger value in a unit of time, the second operating mode is activated. In this case, it can be provided that, for the purpose of flushing surge detection, the length of the time period is detected which has elapsed after the volume of the water flow has exceeded a stored value or has fallen below a stored value. In particular, the length of the time period since the last precipitation can thus be ascertained and taken into account during the automatic flushing surge detection.

In accordance with the invention, it can be provided that the control device comprises an interface, via which an activation of the first and/or the second operating mode can be manually triggered. In this way, the operator can perform a manual control of the separation device.

In a preferred embodiment, it is provided that the damming body is arranged without any lateral spacing with respect to the side walls of the channel.

In a preferred embodiment, it is provided that the damming body extends over the entire width of the outlet. This contributes in particular to the fact that the separation device can be reliably operated and in particular automatically controlled. By virtue of the fact the damming body extends over the entire width of the outlet, the damming body—independently of the tail water level—can precisely define the outlet cross-section because the damming body limits the outlet cross-section upwards over the entire width of the outlet.

In a further preferred embodiment, it is provided that the damming body is adjustably arranged on a side wall of the outlet. In this way, the outlet cross-section can be set. Preferably, the damming body comprises a base, which is adjustably arranged on the side wall. Preferably, the base can be arranged on the side wall so as to be movable via a first and a second element. In a particularly preferred manner, two damming bodies are provided which are each adjustably arranged opposite one another on a side wall.

Furthermore, in a particularly preferred manner, it can be provided that the control device forms a control loop having a controller, which generates a control signal for the actuator of the damming body, and that the first sensor signal and/or the second sensor signal is used as a control variable of the control loop. In this way, it is possible to regulate the separation device so that even under changing operating states, effective retention of the separation device is achieved, wherein at the same time the undesired deposition of sand (or other objects heavier than water) upstream of the separation screen is reduced. In particular, the advantage of the regulation is that the damming body—in each case adapted to the respective operating state—can be moved to a multiplicity of positions, in which the outlet cross-section is set differently in each case.

In a further improvement, it is provided that the actuator includes a servo-motor. In particular, the servo-motor can be a stepping motor.

In a further preferred embodiment, it is provided that the actuator comprises a fluid source in order to adjust the damming body. The fluid source can provide in particular a gas, such as e.g. air, under pressure. However, the fluid source can also provide a liquid, such as in particular water, under pressure.

In this case, an elastically deformable hollow body can be provided which comprises a hollow space and which is changed in terms of its volume and/or shape via the fluid source. For this purpose, the fluid can be conveyed into the hollow space and released therefrom. The hollow body can be designed e.g. as a cushion or balloon. It can be provided that the immersion body is moved and thus adjusted with the hollow body. In this case, it is possible that the hollow body is arranged on a side wall of the channel.

In a further improvement, it is provided that the immersion body itself is designed as a volume-variable and/or shape-variable hollow body having an immersion body wall. Fluid can be conveyed into the hollow body via the fluid source. By conveying the fluid into, or releasing it from, the hollow space, the volume and/or shape of the immersion body can be changed. The damming body can thus be adjusted in a particularly effective manner.

In a further improvement, it is provided that the control device comprises a sensor for detecting the position of the damming body. In this way, it is possible to provide feedback relating to the position of the damming body, which enables the control device to perform the control even more effectively.

In a further improvement, it is provided that the damming body is plate-shaped. For example, the damming body can be a plate made of a metal sheet. By bringing the plate-shaped damming body (or a portion thereof) upwards, the outlet cross-section can be increased. Conversely, the outlet cross-section can be reduced by bringing the damming body (or a portion thereof) downwards. A portion of the damming body can be moved e.g. upwards and downwards by rotating the damming body about an axis of rotation.

Furthermore, it is preferred that the outlet cross-section is at least 3% larger in each the second position and third position than in the first position. In a particularly preferred manner, the outlet cross-section is at least 5% larger in each the second position and third position than in the first position.

Further objectives, features, advantages and possible applications of the present invention will be apparent from the description hereinafter of exemplified embodiments with reference to the drawing. All of the described and/or figuratively illustrated features form the subject matter of the invention in their own right or in any meaningful combination, even irrespective of the combination in individual claims or dependency references thereof.

DETAILED DESCRIPTION

Figure 1:
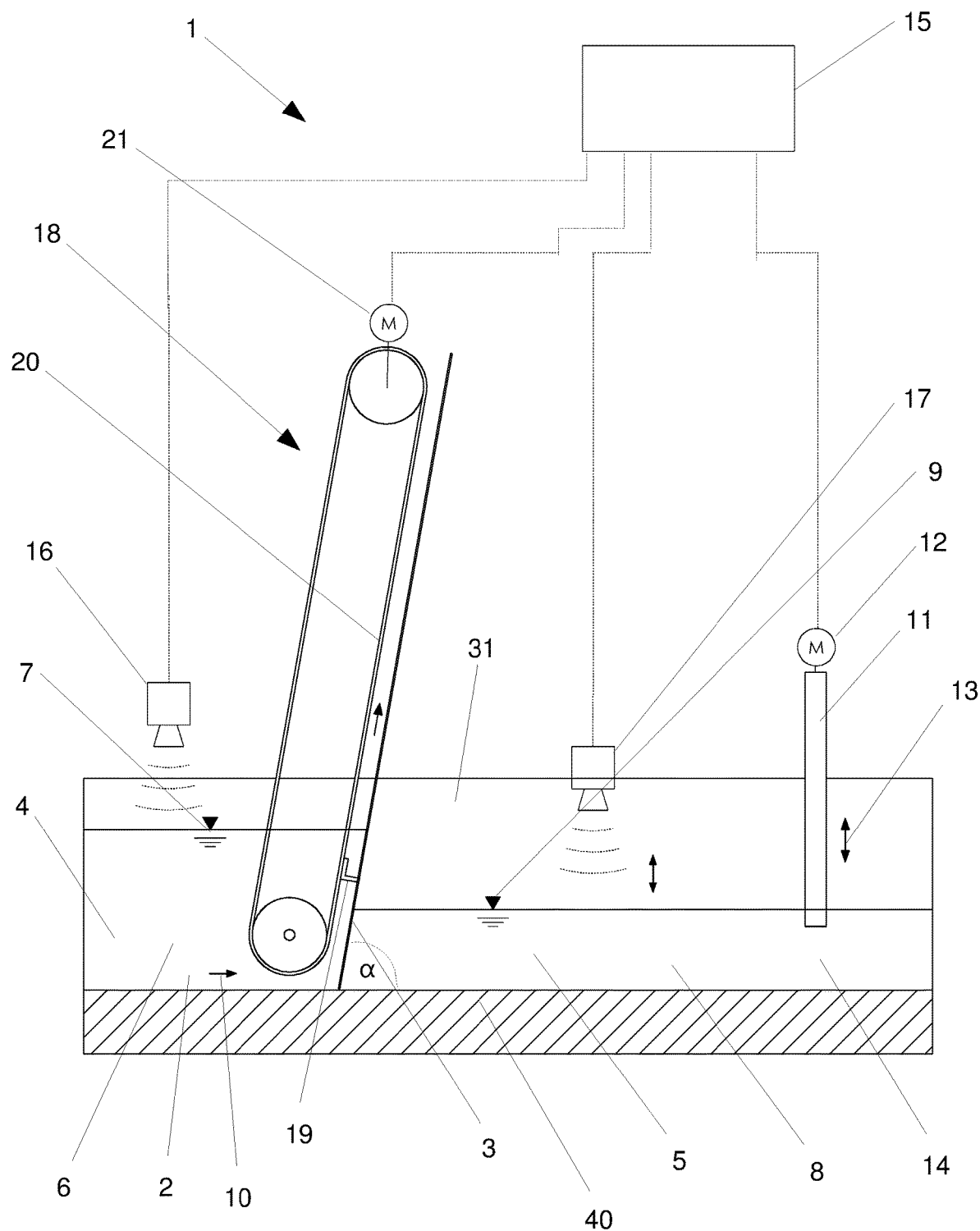
FIG. 1 shows a separation device in accordance with the invention in a longitudinal sectional view.
Figure 2:
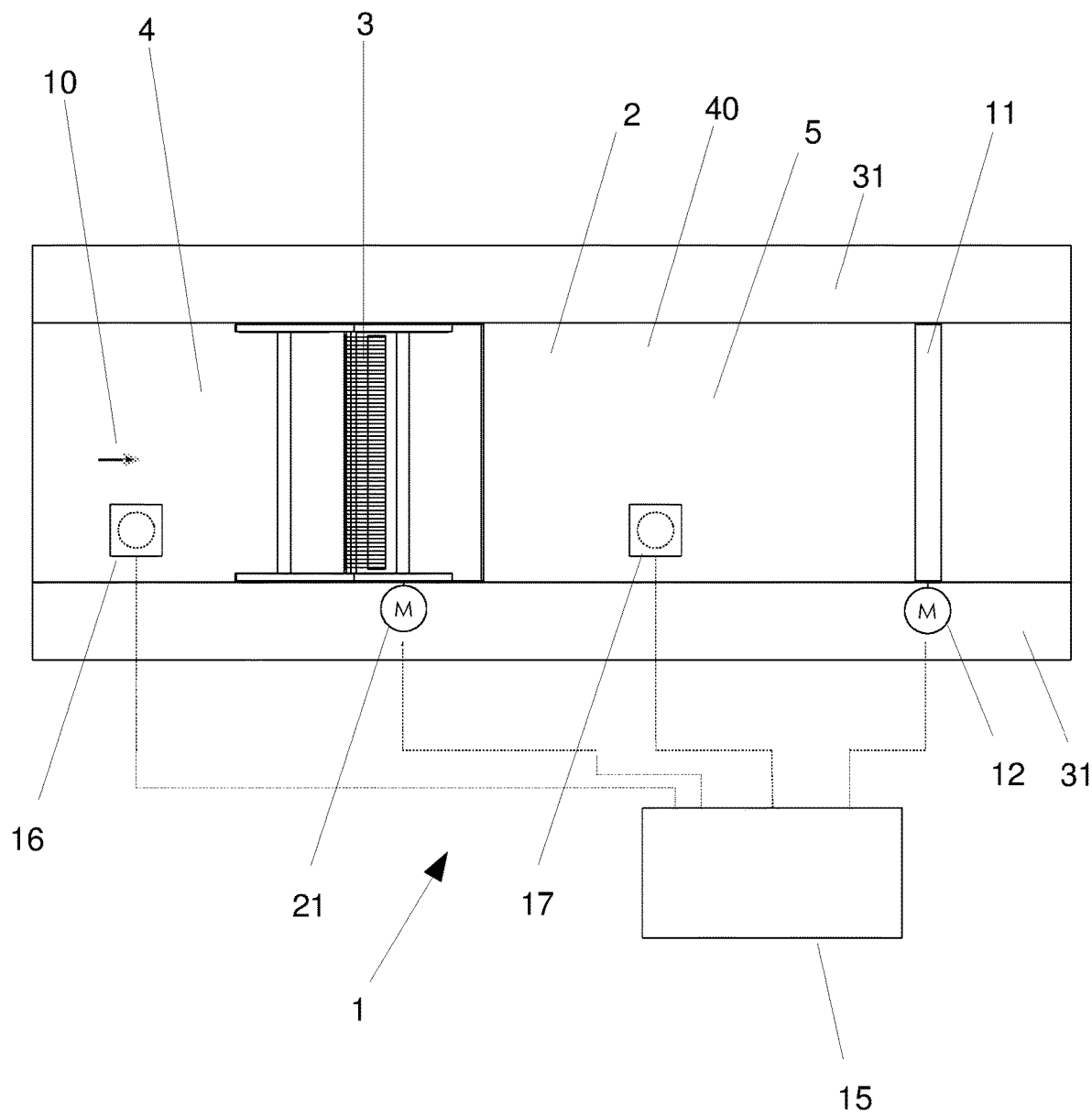
FIG. 2 shows the separation device of FIG. 1 in a plan view.

The separation device 1, illustrated in FIGS. 1 and 2, for removing objects from a water flow comprises a channel 2, in which a separation screen 3 is arranged. The channel 2 forms an inlet 4 and an outlet 5 for the separation screen 3. The channel 2 comprises a bottom 40 and two opposite side walls 31. In the illustrated exemplified embodiment, the channel 2 is open at the top. The water flow is directed via the inlet 4 to the separation screen 3. After passing through the separation screen 3, the water flow can be discharged through the outlet 5. During operation, as clearly evident in FIG. 1, a head water 6 having a head water level 7 is provided in the inlet 4 upstream of the separation screen 3. A tail water 8 having a tail water level 9 is provided in the outlet 5. Corresponding to the flow direction of the water from the inlet 4 to the outlet 5, the head water level 7 is higher than the tail water level 9. The resulting height difference permits the flow of the water through the channel 2 in the flow direction indicated by the arrow 10. The separation device can be integrated in particular into a sewage treatment plant.

In the illustrated embodiment, the separation screen 3 is designed as a bar screen and comprises a multiplicity of screen bars arranged next to one another. The screen bars are arranged in parallel with one another. They extend at an angle α to the horizontal. Passages for the water flow are formed between the screen bars. The schematic illustration in FIGS. 1 and 2 also shows that the separation device comprises a damming body 11, which is arranged in the outlet 5. The damming body 11 is designed for immersion into the water flow in the flow direction downstream of the separation screen 3. The damming body 11 comprises an actuator 12, by means of which the damming body 11 can be moved in a reciprocating manner in the adjusting direction 13. The damming body 11 can occupy a first position in which the outlet cross-section is smaller, a second position in which the outlet cross-section is larger, and a third position in which the outlet cross-section is smaller or larger than in the second position. The adjustment of the damming body is not restricted to the first, second and third position but instead the damming body in the illustrated exemplified embodiment can occupy a multiplicity of positions each with a different outlet cross-section 14. In this way, the outlet cross-section 14 can be set in a broad range. FIG. 2 shows that the damming body 11 extends over the entire width of the channel 2 in the area of the outlet 5.

Furthermore, the separation device comprises a control device 15. The control device 15 can be used to actuate the actuator 12 in order to adjust the damming body 11.

The control device 15 comprises a first sensor 16, by means of which a first sensor signal is generated. The first sensor 16 generates a first sensor signal, which is dependent upon the size of the water flow. In the illustrated exemplified embodiment, the first sensor 16 detects the height of the head water, respectively the head water level 7. The first sensor can be designed e.g. as a contactlessly measuring ultrasonic sensor or as a radar sensor.

In the illustrated embodiment, the control device 15 also comprises a second sensor 17. A second sensor signal is generated thereby. The second sensor signal is likewise dependent upon the size of the water flow. In the illustrated embodiment, the second sensor 17 measures the height of the tail water, respectively the tail water level 9. The second sensor 17 can also be a contactlessly measuring ultrasonic sensor or a radar sensor.

The first sensor 16 and the second sensor 17 are connected to the control device 15 via the signal lines indicated by broken lines. The actuator 12 is connected to the control device 15 via a control line indicated by broken lines.

The control device 15 comprises a plurality of operating modes. In a first operating mode, the flow rate in the area of the separation screen 3 is increased by bringing the damming body 11 from a first position, in which the outlet cross-section 14 is smaller, to a second position in which the outlet cross-section 14 is larger. Furthermore, the control device 15 comprises a second operating mode, in which the flow rate in the area of the separation screen 3 is reduced by bringing the damming body 11 from the second position to the third position, wherein the outlet cross-section 14 is smaller in the third position than in the second position. In this way, the flow rate in the area of the separation screen 3 can be changed. In this way, it is possible to operate the separation screen 3 in an optimised manner even when the size of the water flow varies. On the one hand, it is possible to not allow the flow rate in the area of the separation screen to increase excessively. As a result, the retention of the separation screen can be improved quite considerably. On the other hand, it is possible to avoid an excessive reduction in the flow rate in the area of the separation screen 3, which results in a deposition of sand in the inlet upstream of the separation screen 3. The control device 15 is configured such that it can automatically activate the first and (at a different point in time) the second operating mode. In this manner, the control device 15 can implement automatically an adaptation to the respective operating situation.

In the illustrated embodiment, the control device 15 triggers the activation of the respective operating mode on the basis of the measurement signals of the first sensor 16 and the second sensor 17.

In particular, the control device can be designed such that it performs the following control tasks:

A first trigger value for the first sensor signal—or the second sensor signal—can be stored in the control device. In this way, the control device can activate the first operating mode when the trigger value is reached or exceeded. This is considered in particular e.g. if the water flow rises or is very large. In this way, the damming body 11 can also be set such that it offers the least possible resistance to the water flow. For example, the damming body can then be moved completely out of the tail water. In this way, the maximum throughput of the separation device can be maintained when there is a significant occurrence of water, such as e.g. during heavy rain.

A second trigger value for the first sensor signal—or the second sensor signal—can be stored in the control device. In this way, the control device can activate the second operating mode when the trigger value is reached or when the value reached falls below the trigger value. This is considered in particular when the accumulation of water is receding. In this way, the outlet cross-section can be adapted to the reduced occurrence of water and the flow rate can be set in a range optimised for the separation screen.

A third trigger value for the first sensor signal and/or the second sensor signal can be stored in the control device 15, wherein the control device activates the first operating mode when the third trigger value is reached or when the value reached falls below the third trigger value. In this way, it is possible to react in particular to a very low water flow. In this situation, if the damming body 11 is immersed too deeply into the water, it would result in an undesired reduction in the flow rate in the area of the separation screen 3. For example, the damming body 11 can then be moved completely out of the tail water 9. Since the flow rate is already low by reason of the small water flow, it could otherwise result in undesired depositions of sand and the like upstream of the separation screen 3. If in this situation the first operating mode is activated, the flow rate can be increased and the undesired accumulation of sand and the like can be reduced or avoided.

Furthermore, the control device can also enable keeping the flow rate in the area of the separation screen in a favourable range. The flow rate in the area of the separation screen can be ascertained e.g. on the basis of the measured difference between the head water level and the tail water level. In this case, it is advantageous if the control device can adjust the damming body 11 continuously or in a multiplicity of steps in order to set the immersion depth of the damming body 11. In this way, the flow rate in the area of the separation screen can be kept in the desired range.

In particular, it is also possible that the control device forms a control loop comprising a controller, which generates the control signal for the actuator 12. The actuator 12 can be actuated by the control signal e.g. such that the damming body 11 is moved to the first, the second or the third position. In particular, the first and/or second sensor signal can be used as a control variable of the control loop. In particular, the difference between the head water level 7 and the tail water level 9 indicated by the first and second sensor signal is used by the control device for regulation purposes. In this way, a closed control loop can be formed which reliably enables keeping the flow rate in the area of the separation screen 3 in the desired range.

Furthermore, the control device 15 can have a flushing surge detector. For this purpose, an increase in the water flow can be detected with the aid of the first and/or the second sensor signal. If this increase is above a flushing surge trigger value stored in the control device 15, the occurrence of a flushing surge can be detected. Then, the control device 15 can activate preferably the second operating mode in order to reduce the flow rate in the area of the separation screen and thereby improve the retention of the separation screen.

Furthermore, the control device 15 can include a time program, which activates the first or the second operating mode at specific points in time. Preferably, the points in time are set by the plant operators.

FIG. 1 also shows that the separation screen 3 is provided with a cleaning device 18. The schematically illustrated cleaning device 18 can have e.g. in particular circumferential rakes 19. They can move objects, which have accumulated in the flow direction upstream of the separation screen 3, in particular upwards away from the separation screen 3. The rakes 19 can be arranged on a circumferential traction means 20, which can include e.g. a chain. The rakes 19 extend preferably into the intermediate spaces formed between the rake bars. The cleaning device 18 is driven by a schematically illustrated motor 21. The objects removed from the separation screen 3 by the cleaning device 18 can be transported in a known manner to a washing press or a collecting vessel (not illustrated).

The control device 15 can be configured to automatically activate the cleaning device 18. For this purpose, the control device 15 can ascertain e.g. the head water level 7 and the tail water level 9 on the basis of the first and second sensor signal. If the separation screen 3 becomes clogged with separated objects, then its flow resistance increases. As a consequence, the difference between the head water level 7 and the tail water level 9 becomes greater. A trigger value can be stored in the control device 15 so that the cleaning is triggered when a difference between the head water and tail water levels 7 and 9—ascertained with the first and second signal—is exceeded. For this purpose, the control device is connected to the motor 21 via a control line illustrated by broken lines. The cleaning device 18 is activated by virtue of the fact that the motor 21 is put into operation.

Figure 3:
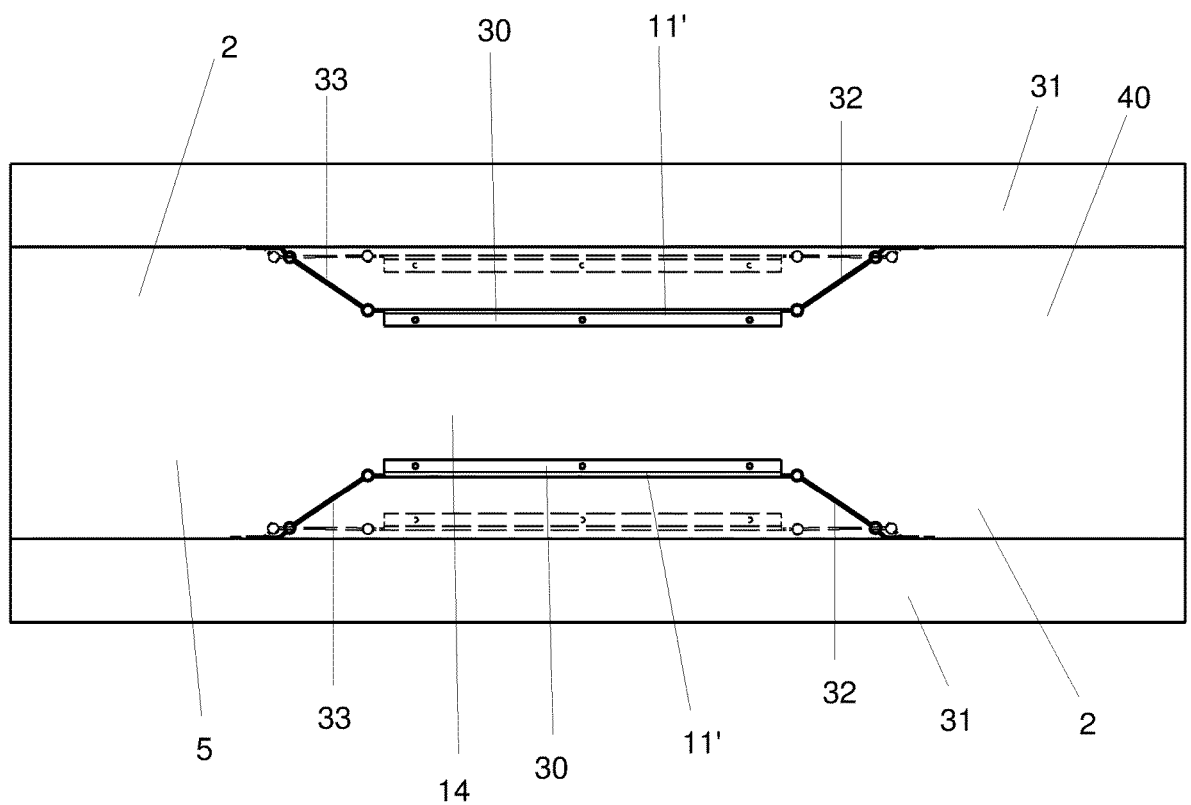
FIG. 3 shows a plan view of the outlet of a separation device in accordance with the invention including a further embodiment of a damming body.

FIG. 3 shows a plan view of the outlet 5 of a separation device according to a further embodiment. This figure illustrates a further embodiment of the damming body 11', which differs from the damming body 11. In the case of the separation device illustrated in FIGS. 1 and 2, the damming body 11' can be used instead of the damming body 11. In this respect, the description of FIGS. 1 and 2 applies accordingly to the damming body 11'.

FIG. 3 schematically illustrates the outlet 5 of a separation device following on from the separation screen 3. The separation screen 3, the inlet 4 and the control device comprising the sensors 16 and 17 can be configured as in the case of the embodiment described in FIGS. 1 and 2, wherein the control device 15 serves to set the outlet cross-section 14 with the damming body 11'.

The damming body 11' comprises a base 30, which is adjustably arranged on a side wall 31 of the channel 2. The base 30 is connected to the side wall 31 via a first holding element 32 and a second holding element 33. The base 30 can preferably be plate-shaped. The base 30 can be arranged in parallel with the side wall 31, as illustrated. The first holding element 32 is movably connected to the base 30. The second holding element 33 is movably connected to the base 30. In this manner, the base 30 is movably held so that the damming body 11' can occupy a first position, in which the outlet cross-section 14 is smaller. This is illustrated in FIG. 3 by continuous lines. Furthermore, the base 30 can occupy a second position, in which the outlet cross-section 14 is larger. This is illustrated in FIG. 3 by broken lines. In the second position, the base 30 is located closer to the side wall 31. In the case of the illustrated embodiment, a first joint is provided between the first holding element 32 and the base 30. The first holding element 32 is connected to the side wall 31 via a second joint. Accordingly, a first joint is provided between the second holding element 33 and the base 30. The second holding element 33 is connected to the side wall 31 via a second joint. The water flow can be directed away from the side wall 31 by means of the base 30 and the first and second holding elements 32, 33, whereby the outlet cross-section 14 is changed.

For reasons of clarity, the adjustment device of the damming body 11' is not shown in FIG. 3. The adjustment can be performed e.g. by means of an inflatable air cushion. This can be arranged in particular between the side wall 31 and the base 30. The inflation of the air cushion can be performed by a compressed air source and is triggered by the control device 15 described above. In this manner, the base 30 can be moved away from the side wall 31 so that the outlet cross-section 14 is reduced. If air is released from the air cushion, the damming body 11' can then be moved towards the side wall 31 so that the outlet cross-section 14 is then increased. In this case, a spring, which is not shown, can be used which urges the base 30 in the direction of the side wall 31. The adjustment can also be performed in another manner, e.g. with a motor.

Whereas in FIG. 3 only two positions of the damming body 11' are illustrated, this damming body can occupy further positions, which are not illustrated, between the positions illustrated. In this way, the outlet cross-section 14 can be set in a continuously variable manner or in small steps.

It is evident in FIG. 3 that, in the outlet 5, two identical damming bodies 11' are arranged opposite one another on the side walls 31.

The invention claimed is:

1. A separation device for removing objects from a water flow having a flow velocity, comprising a separation screen and an open channel which forms an inlet and an outlet for the separation screen, wherein, during operation, an upstream water level can be provided in the inlet upstream of the separation screen and a downstream water level can be provided in the outlet downstream of the separation screen, wherein the outlet comprises an outlet cross-section for the water flow, a damming body, which can be adjusted via an actuator, for immersion into the outlet, the damming body adjustable at least between a first position and a second position, wherein the outlet cross-section is smaller in the first position and the outlet cross-section is larger in the second position, a first sensor configured to detect a first characteristic of the water flow in the open channel, and a control device in communication with the first sensor, wherein the control device has a first operating mode in which the flow velocity of the water flow in an area of the separation screen is increased by bringing the damming body from the first position to the second position and a second operating mode in which the flow velocity of the water flow in the area of the separation screen is changed by bringing the damming body from the second position to a third position, wherein the outlet cross-section in the third position is smaller or larger than the outlet cross-section in the second position, and wherein the control device is configured to automatically activate the first and/or the second operating mode based upon a first sensor signal sent to the control device by the first sensor wherein the first sensor signal relates to the first characteristic of the water flow.

2. The separation device according to claim 1, wherein the control device includes a time program, which triggers the activation of the first and/or the second operating mode.

3. The separation device according to claim 1, wherein the first characteristic of the water flow comprises a level of the water flow.

4. The separation device according to claim 1, wherein the first characteristic is a characteristic of the water flow in the open channel upstream of the separation device, and the separation device further comprising a second sensor configured to measure a second characteristic of the water flow downstream of the separation device, the control device in communication with the second sensor, and wherein the control device is configured to automatically activate the first and/or the second operating mode in dependence upon a second sensor signal sent to the control device by the second sensor wherein the second sensor signal relates to the second characteristic of the water flow.

5. The separation device according to claim 4, wherein a first trigger value for the first sensor signal and/or the second sensor signal is stored in the control device and wherein the control device activates the first operating mode when the first trigger value is reached or exceeded.

6. The separation device according to claim 4, wherein a second trigger value for the first sensor signal and/or the second sensor signal is stored in the control device and wherein the control device activates the second operating mode when the second trigger value is reached or not exceeded.

7. The separation device according to claim 4, wherein a third trigger value for the first sensor signal and/or the second sensor signal is stored in the control device and wherein the control device activates the first operating mode when the third trigger value is reached or not exceeded.

8. The separation device according to claim 4, further comprising a cleaning device associated with the separation screen and in communication with the control device, wherein the first characteristic is the upstream water level and the second characteristic is the downstream water level, and wherein the control device compares signals received from the first sensor regarding the upstream water level and the second senor regarding the downstream water level and activates the cleaning device to clean the separation screen when a difference between the upstream water level and the downstream water level reaches or exceeds a fourth trigger value stored in the control device.

9. The separation device according to claim 4, wherein the control device comprises a flushing surge detector which detects an increase in the water flow with the aid of at least one of the first and the second sensor signal, wherein a flushing surge trigger value is stored in the control device and wherein, if the at least one of the first and the second sensor signal or an increase in the at least one of the first and second sensor signal reaches or exceeds the surge trigger value in a unit of time, the second operating mode is activated.

10. The separation device according to claim 4, wherein the control device forms a control loop having a controller which generates a control signal for the actuator of the damming body, and in that the first sensor signal and/or the second sensor signal is used as a control variable of the control loop.

11. The separation device according to claim 1, wherein the damming body has a top, a bottom, a first side and a second side spaced from the first side, the outlet cross section of the open channel has a width and the damming body extends over the width of the outlet cross section whereby water in the open channel cannot flow around the first side and the second side of the damming body.

12. The separation device according to claim 1, wherein the damming body is adjustably arranged on a side wall of the outlet.

13. The separation device of claim 1, wherein the first characteristic is the level of the water in the open channel upstream of the separation device or the level of the water in the open channel downstream of the separation device.

14. The separation device of claim 1, wherein the first sensor is located downstream of the separation screen.

15. The separation device of claim 4, wherein the first characteristic is the level of the water in the open channel upstream of the separation device and the second characteristic is the level of the water in the open channel downstream of the separation device.

16. A separation device for removing objects from a water flow having a flow velocity, comprising a separation screen and a channel which forms an inlet and an outlet for the separation screen, wherein, during operation, an upstream water level can be provided in the inlet upstream of the separation screen and a downstream water level can be provided in the outlet downstream of the separation screen, wherein the outlet comprises an outlet cross-section for the water flow, a damming body, which can be adjusted via an actuator, for immersion into the outlet, the damming body adjustable at least between a first position and a second position, wherein the outlet cross-section is smaller in the first position and the outlet cross-section is larger in the second position, a first sensor configured to detect the upstream water level in the open channel, a second sensor configured to detect the downstream water level in the open channel, a cleaning device associated with the separation screen and configured to clean the separation screen when activated, and a control device in communication with the first sensor, the second sensor and the cleaning device, wherein the control device receives information regarding the upstream water level from the first sensor and receives information regarding the downstream water level from the second sensor and compares the upstream water level and the downstream water level, has a first operating mode in which the flow velocity of the water flow in an area of the channel proximate the separation screen is increased by bringing the damming body from the first position to the second position, a second operating mode in which the flow velocity of the water flow in the area proximate the separation screen is changed by bringing the damming body from the second position to a third position, wherein the outlet cross-section in the third position is smaller or larger than the outlet cross-section in the second position, and a third operating mode in which the cleaning device is activated determines a difference between the upstream water level and the downstream water level exceeds a predetermined value, and wherein the control device is configured to automatically activate the first operating mode, the second operating mode and the third operating mode.

17. A separation device for removing objects from a water flow having a flow velocity, comprising a separation screen and a channel which forms an inlet and an outlet for the separation screen, wherein, during operation, an upstream water level can be provided in the inlet upstream of the separation screen and a downstream water level can be provided in the outlet downstream of the separation screen, wherein the outlet comprises an outlet cross-section having a width and a height for the water flow, a damming body extending across the entire width of the outlet cross-section wherein water cannot pass around the damming body, the damming body adjustable via an actuator for immersion into the outlet, the damming body adjustable at least between a first position and a second position, wherein the outlet cross-section is smaller in the first position and the outlet cross-section is larger in the second position, a first sensor configured to measure a first characteristic of the water flow in the channel and a control device in communication with the first sensor, wherein the control device has a first operating mode in which the flow velocity of the water flow in an area of the channel proximate the separation screen is increased by bringing the damming body from the first position to the second position and a second operating mode in which the flow velocity of the water flow in the area proximate the separation screen is changed by bringing the damming body from the second position to a third position, wherein the outlet cross-section in the third position is smaller or larger than the outlet cross-section in the second position, and wherein the control device is configured to automatically activate the first and/or the second operating mode based upon a first sensor signal sent to the control device by the first sensor wherein the first sensor signal relates to the first characteristic of the water flow.

\* \* \* \* \*